Figure 1:
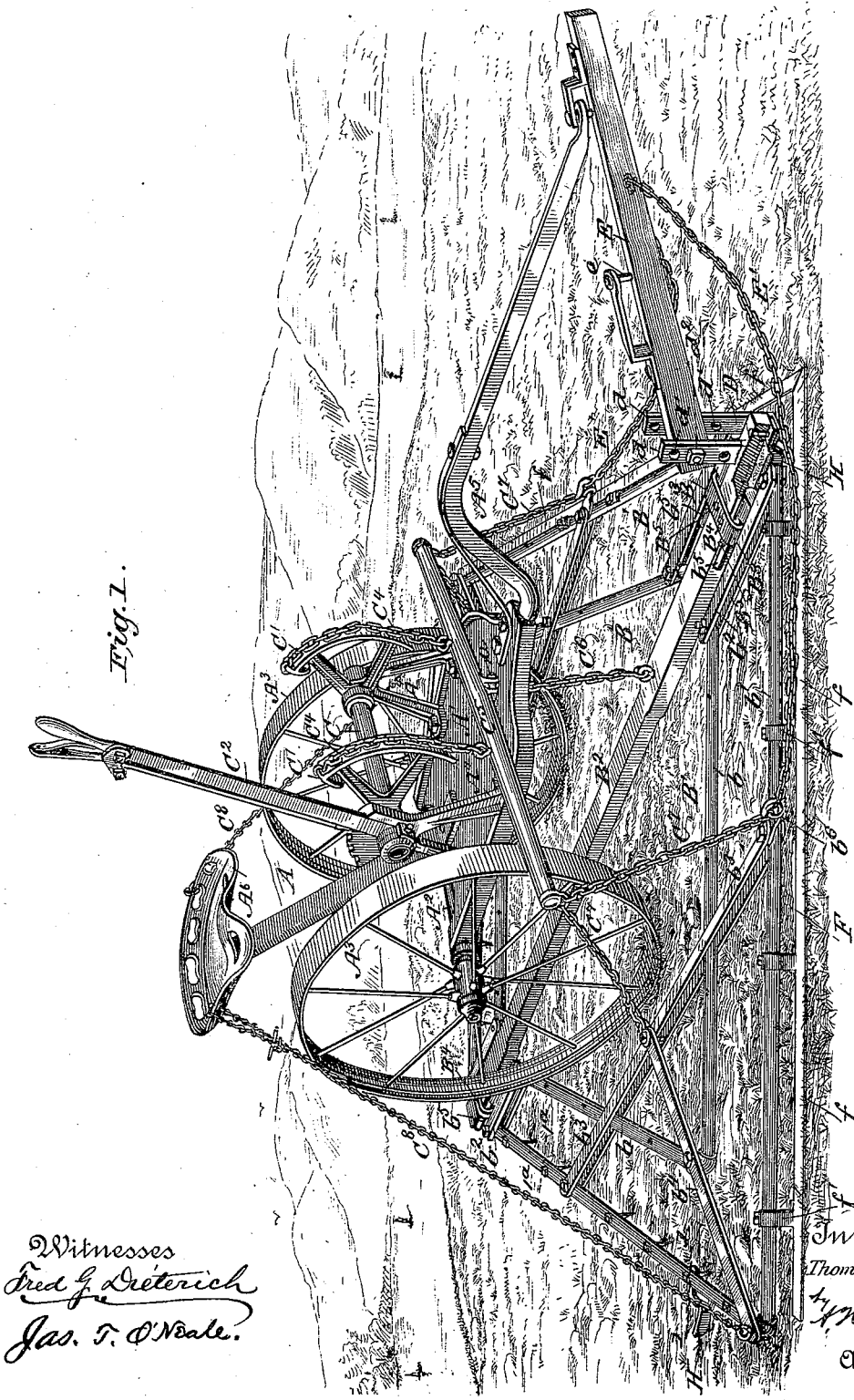

(No Model.) 2 Sheets—Sheet 1.

T. J. HUBBELL.
COMBINED SULKY HARROW AND CULTIVATOR.

No. 512,110. Patented Jan. 2, 1894.

Witnesses
Fred G. Dieterich
Jas. T. O'Neale.

Inventor
Thomas J. Hubbell
by N. H. Evans & Co.
Attorneys (No Model.) 2 Sheets—Sheet 2.
T. J. HUBBELL.
COMBINED SULKY HARROW AND CULTIVATOR.
No. 512,110. Patented Jan. 2, 1894.
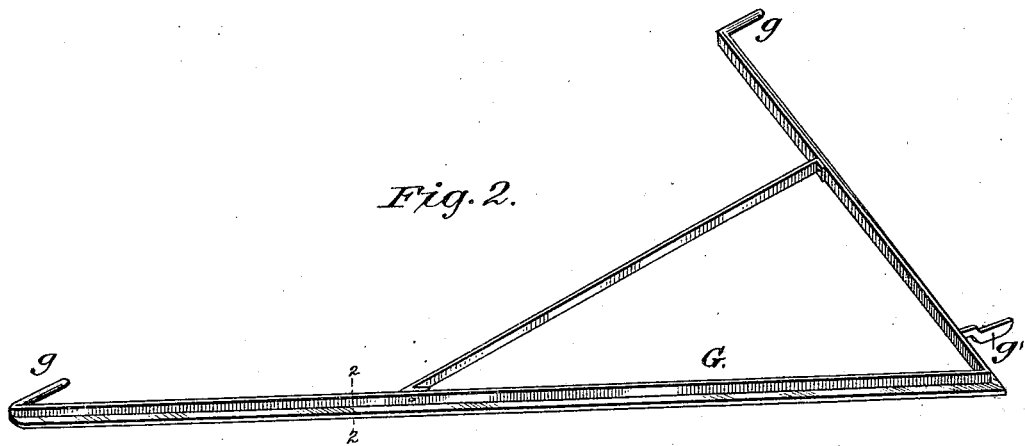
*Fig. 2.*
*Fig. 3.*
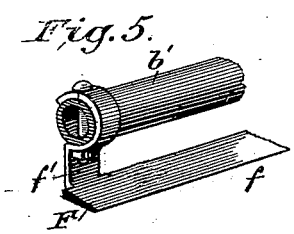
*Fig. 5.*
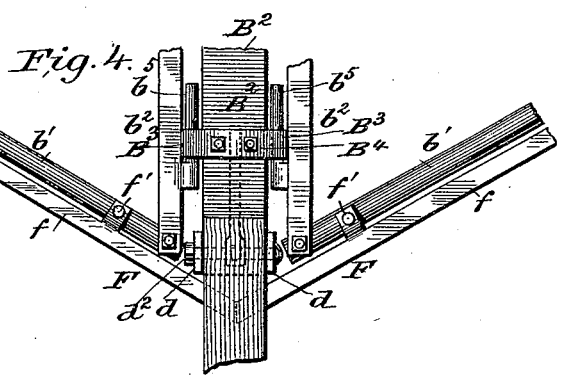
*Fig. 4.*
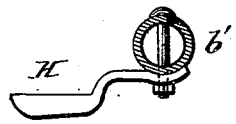
*Fig. 6.*
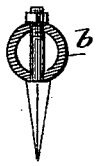
*Fig. 7.*
Witnesses
Fred G. Dieterich
Jas. T. O'Neale
Inventor
Thomas J. Hubbell
per A. H. Evans
Attorneys

UNITED STATES PATENT OFFICE.

THOMAS JEFFERSON HUBBELL, OF SANTA CRUZ, CALIFORNIA.

COMBINED SULKY HARROW AND CULTIVATOR.

SPECIFICATION forming part of Letters Patent No. 512,110, dated January 2, 1894.

Application filed October 17, 1893. Serial No. 488,419. (No model.)

*To all whom it may concern:*

Be it known that I, THOMAS JEFFERSON HUBBELL, a citizen of the United States, residing at Santa Cruz, in the county of Santa Cruz and State of California, have invented certain new and useful Improvements in a Combined Sulky Harrow and Cultivator, of which the following is a full, clear, and exact description, reference being had to the accompanying drawings, forming a part of this specification, in which—

Figure 1, is a perspective of my machine in working position and arranged to cut the weeds, rake them, and harrow the ground. Fig. 2, shows a cultivator frame-section interchangeable with the frame-sections of Fig. 1. Fig. 3, is a section on line 2—2 Fig. 2. Fig. 4, is a detail plan showing the hinge connections between the forward ends of the frame sections and the longitudinal beam. Fig. 5, is a detail perspective showing the means of attaching the cutter to the frame-section. Fig. 6, is a section on line 1—1 Fig. 1, and Fig. 7, is a section on line 1$^a$—1$^a$ Fig. 1.

The object of the invention is to improve and simplify the construction of sulky harrows and cultivators as at present constructed, and the invention consists in the construction and combination of parts hereinafter described and specifically pointed out in the claims.

In the drawings A, represents the sulky comprising the platform, A', the axle, A$^2$, the wheels A$^3$, and the seat A$^6$.

B, represents the combined harrow and cultivator frame formed of two triangular sections B' B' hinged at their inner edges to a central longitudinal connecting beam B$^2$. Each section B' is formed of two spaced bars $b$ $b'$, preferably formed of metal tubing, and connected at their ends by pairs of short bars $b^2$ parallel with the beam B$^2$. The bars $b'$ $b'$ are connected also by upper and lower straps $b^3$ extending longitudinally of the machine and also by a transverse strap $b^4$ bolted to their angles and to the straps $b^3$ as clearly shown in the drawings. The short-bars $b^2$ are provided with rearwardly extending longitudinally aligned pintles $b^5$ which project through eyes B$^3$ on the ends of the transverse plates B$^4$ bolted to the connecting beam B$^2$. The pintles are inserted from the front and are held from displacement by means of suitable keys B$^5$ passed through the two forward pintles.

The platform is provided with two standards A$^4$ provided with bearings in their upper ends for the transverse rock shaft C which carries two grooved segmental arms and an operating lever C$^2$ provided with a hand operated locking latch engaging a segmental rack on the upper end of one of the standards A$^4$. Forwardly extending chains C$^4$ are secured to the rear ends of these segmental arms C' and extend to their opposite ends where they support a transverse lifting bar C$^5$ which in turn is connected at its middle to the connecting beam by a chain C$^6$ extending through the slot $a$ in the platform. From the ends of the bar C$^5$ extend chains C$^7$ which are connected at their lower ends to the central and front portions respectively, of the section B'; one of said chains being secured by the inner bolt of the strap $b^4$ and the other to a hook $b^6$ held by the forward bolt of the straps $b^3$. These chains C$^6$ C$^7$ suspend and balance the frame B as a whole in a horizontal plane so that it has the freedom of motion necessary to a harrow and cultivator of this class. Hand chains C$^8$ extend from opposite sides of the driver's seat downwardly and outwardly to the outer angles of the sections B' B'. Angle irons D are bolted to the front extremity of the connecting beam B and their parallel vertical members $d$ are each provided with a series of apertures $d'$ through which passes the bolt $d^2$ on which the rear of the tongue E pivots. The tongue E in front of its pivot is connected by stay chains E' with the hooks $b^6$ of the frame sections B'.

From the front end of the platform A' extends an upwardly and forwardly projecting reach A$^5$ the front end of which is bolted to the tongue in advance of the double-tree bolt $e$.

F, is a cutter comprising the cutter blade $f$, and upwardly extending arms $f'$ provided at their upper ends with forwardly projecting hooks open at their rear sides to receive the front bars $b'$, the top and bottom portions of the hooks being apertured to receive bolts which are passed down through the end, and if desired, middle harrow tooth openings. The inner ends of the two cutters are extended so as to overlap or abut whereby the two cutters F F together form a V shaped knife at the front of the frame B.

I provide the machine with interchangeable harrow and cultivator sections one of the cultivator sections G, being shown in Fig. 2. It is preferably constructed of angle iron and is somewhat narrower than the harrow section. The opposite ends of the cultivator frame are provided with pintles $g$, which fit the front and rear eyes $B^3$ so that the two classes of frames may be readily changed one for the other.

H, represents detachable runners secured to the front end of the bar $B^2$ and to the rear bars $b$, of the frame sections $B'$ adjacent to the outer angles thereof and are only used when the cutters F are in place. Similar runners $g'$ are used with the cultivator sections.

When the machine is adjusted as in Fig. 1, it is ready to cut weeds and harrow the ground with its rear harrow teeth all of the other harrow teeth having been removed. As the machine moves along the cutters enter the ground to a slight extent and cut down the weeds, and the rear harrow teeth pulverize the ground and at the same time rake the weeds. The operator by pulling on one of the hand-chains $C^8$ can elevate the frame sections $B'$ to which it is connected and thus dump the weeds. The runners impart enough stability to the frame sections to permit the effective use of the cutters F.

When the machine is to be used solely as a harrow the cutters F and the runners H are removed whereupon the frame B as a whole will be freely suspended in a horizontal plane by the chains $C^6$ $C^7$ and will be free to rise and fall in all directions and owing to its shape and hinged connections will readily clear itself from obstructions.

The sections $B'$ may be readily removed from the bar $B^2$ and the cultivator sections G substituted therefor in a very few moments as it is only necessary to disconnect the chains $C^7$ $C^8$ and to remove keys $B^5$ and pull the sections forwardly to disconnect them and then pass the pintles of the cultivator sections in the eyes $B^3$ and connect the chains $C^7$ $C^8$ with said sections. This is far more expeditious than it would be to take out all of the harrow teeth and insert cultivator teeth.

In driving to and from the field to be worked, the frame B as a whole may be readily elevated by throwing the lever $C^2$ to the rear and this same mechanism provides for lowering the frame to any desired extent, to permit the cutter, harrow teeth or cultivator teeth to penetrate the ground to any desired extent.

If desired either frame section $B'$ may be swung up out of action by means of the chains $C^8$ and thus the machine may be used to great advantage in orchards and other places where trees are found or obstacles of any sort are to be avoided.

The tongue may be properly adjusted by means of the apertures $d'$ and bolt $d^2$.

Having thus described my invention, what I claim, and desire to secure by Letters Patent of the United States, is—

1. The combination with a sulky having a forwardly extending arm or reach, of a longitudinally extending beam adjustably suspended between its ends from the sulky, and provided on its opposite sides at its front and rear ends with hinge sections adapted to receive the interchangeable cultivator, and harrow frame sections, and a tongue connected at its rear end to the forward end of the said beam and also connected in front thereof to the forward end of the sulky arm, substantially as herein described.

2. The combination with the sulky having a forwardly extending arm or reach of a longitudinally extending beam adjustably suspended between its ends from the sulky and projecting in front and rear thereof, hinge sections at both ends of the beam and at opposite sides thereof, and vertically extending plates secured to the front end of the beam and each provided with a series of apertures, and the tongue having a transverse aperture in its rear end through which and any two aligned apertures in said plates passes a bolt, said tongue being connected in advance of said bolt to the forward extremity of the said sulky arm or reach, substantially as herein described.

3. The combination with the sulky frame having a forwardly extending arm or reach, standards on the sulky platform, a transverse rock-shaft journaled in bearings on the upper ends of said standards and provided with arms carrying the end and intermediate chains, and an operating lever having a suitable locking mechanism, of an open frame within which the sulky is inclosed, said frame comprising a longitudinally extending beam below the sulky platform having frame sections hinged detachably to its opposite sides; the said beam being connected with said middle chain and the hinged frame sections being respectively connected with the lower ends of said end chains, and the tongue connected with the forward end of the said beam and also with the forward end of the sulky arm or reach, substantially as herein described.

4. The combination with the sulky having a forwardly extending arm or reach and the tongue connected near its rear end with the forward end of said arm or reach, of the longitudinally extending beam connected at its forward end to the rear extremity of the tongue and suspended adjustably in rear thereof from the sulky, hinge eyes at the ends of the beam on opposite sides thereof, and opposite frame sections having at both ends of their adjacent edges rearwardly extending aligned pintles inserted removably into the said eyes, substantially as herein described.

5. The combination with the sulky having a seat thereon and provided with a forwardly extending arm or reach and with standards on its platform, a rock-shaft journaled in bearings on said standards and provided with an operating lever and with chain-carrying-arms, and a transverse bar suspended from said chains and carrying end and intermediate chains, of the frame formed of opposite side sections and a longitudinally extending bar to which said sections are hinged, said bar being connected to the middle chain and the side sections being connected to the respective end chains, hand operated chains extending from opposite sides of the driver's seat and connected at their lower ends to the outer portions of the said frame sections, and the tongue connected at its rear extremity to the forward end of the said connecting beam, and in front thereof connected with the sulky arm or reach, substantially as herein described.

6. The combination with the sulky having a forwardly extending reach or arm, of a longitudinally extending beam adjustably suspended between its ends from the sulky, and provided on its opposite sides at its front and rear ends with hinge eyes, the triangular frame sections having pintles to enter said eyes and formed of inner and outer parallel bars for the teeth, and a tongue connected at its rear end to the forward end of the beam and also connected in the front thereof to the forward end of the sulky arm, substantially as herein described.

7. The combination with the longitudinal central beam and the triangular frame sections hinged at their adjacent sides thereto and forming a rectangular frame, of separate and independent cutter blades below and parallel with the front bars of said frame sections and having upwardly extending arms connecting them therewith; the forward ends of said cutters extending to the forward ends of said front bars and said two cutter blades together forming a V shape cutter on the front of the frame, and harrow teeth on the rear bars of the frame sections, substantially as herein described.

8. The combination with the triangular harrow-frame sections the rear bars of which carry cultivator teeth, of cutters having upwardly extending attaching arms detachably secured to the front diverging edges of the frame sections and together forming a V shape cutter to remove the weeds in advance of the said harrow teeth, the said two cutters being below and separated by open spaces from the said front bars to allow the weeds and soil to pass through substantially as herein described.

9. The combination with the triangular frame section the rear bar of which is provided with harrow teeth, of a cutter extending the whole length of the front bar of said frame and provided with upwardly extending arms having rearwardly opening hooks at their upper ends embracing said front bar and bolts passed through openings in the bar and through openings in the upper and lower portions of said hooks, substantially as herein described.

10. The combination with the sulky and the harrow frame therebelow comprising the longitudinal central beam adjustably suspended between its ends from the sulky, and the triangular frame sections hinged at their inner edges to the said beam, and carrying detachable weed cutting blades below and the full length of their front bars; the inner ends of the cutters extending in front of the forward end of the said beam to form together a V shape cutter, harrow teeth on the rear bars of said frame sections, shoes on the said sections and forward end of the beam, and a tongue connected at its rear end to the forward end of the beam and connected in advance thereof with the forward arm or reach of the sulky, substantially as herein described.

11. The combination with an open rectangular harrow or cultivator frame comprising two triangular frame sections hinged at their longitudinal inner edges to permit both to swing freely vertically, of a sulky from which said frame is suspended on its longitudinal central line, a tongue hinged at its rear extremity to the forward end of said frame and loosely connected in advance thereof to a forwardly extending portion of the sulky; the said tongue being unaffected by the vertically swinging movements of said two frame sections, substantially as herein described.

THOMAS JEFFERSON HUBBELL.

Witnesses:
S. A. TERRY,
GEO. E. TERRY.